United States Patent
Kumazawa et al.

(10) Patent No.: US 9,249,855 B2
(45) Date of Patent: Feb. 2, 2016

(54) DAMPER

(75) Inventors: Katsutoshi Kumazawa, Fujisawa (JP); Daisuke Yoshimoto, Fujisawa (JP)

(73) Assignee: OILES CORPORATION, Tokyo (JP)

( * ) Notice: Subject to any disclaimer, the term of this patent is extended or adjusted under 35 U.S.C. 154(b) by 24 days.

(21) Appl. No.: 14/239,539

(22) PCT Filed: May 16, 2012

(86) PCT No.: PCT/JP2012/062485
§ 371 (c)(1),
(2), (4) Date: Feb. 18, 2014

(87) PCT Pub. No.: WO2013/031302
PCT Pub. Date: Mar. 7, 2013

(65) Prior Publication Data
US 2014/0217658 A1    Aug. 7, 2014

(30) Foreign Application Priority Data
Aug. 31, 2011   (JP) .................................. 2011-190176

(51) Int. Cl.
| | |
|---|---|
| F16F 9/12 | (2006.01) |
| F16F 13/00 | (2006.01) |
| G05G 5/03 | (2008.04) |
| B60K 26/02 | (2006.01) |
| F16F 7/09 | (2006.01) |
| G05G 1/44 | (2008.04) |
| F16F 7/06 | (2006.01) |

(52) U.S. Cl.
CPC ............. *F16F 13/005* (2013.01); *B60K 26/021* (2013.01); *F16F 7/095* (2013.01); *G05G 5/03* (2013.01); *F16F 7/06* (2013.01); *F16F 2230/0064* (2013.01); *G05G 1/44* (2013.01)

(58) Field of Classification Search
USPC ............................ 188/82.8, 381; 74/512, 513
See application file for complete search history.

(56) References Cited

U.S. PATENT DOCUMENTS

| | | | | |
|---|---|---|---|---|
| 6,240,801 | B1 * | 6/2001 | Kojima et al. .................. | 74/513 |
| 6,467,370 | B2 * | 10/2002 | Kojima et al. .................. | 74/513 |
| 6,591,712 | B2 * | 7/2003 | Goto et al. ....................... | 74/514 |
| 2003/0009819 | A1 * | 1/2003 | Mizuno et al. .................... | 4/248 |
| 2010/0270113 | A1 * | 10/2010 | Ogawa .......................... | 188/281 |

FOREIGN PATENT DOCUMENTS

| | | |
|---|---|---|
| JP | 2001-51737 A | 2/2001 |
| JP | 2002-12052 A | 1/2002 |
| JP | 2008-114668 A | 5/2008 |

* cited by examiner

*Primary Examiner* — Christopher Schwartz
(74) *Attorney, Agent, or Firm* — patenttm.us

(57) ABSTRACT

Provided is a damper configured so that a compact pedal unit can be obtained using the damper and so that the damper can be easily retrofitted to a pedal unit. A damper (1) comprises elements such as: a pair of cams (slide cam (4) and stationary cam (5)) which rotate relative to each other about the axis (O1) to cause the sloped cam surfaces (4132, 5211) thereof to make sliding contact with each other; a coiled spring (3) which presses the sloped cam surface (4132) of the slide cam (4) against the sloped cam surface (5211) of the stationary cam (5); a case (2); and a resin roller (8) which is fitted in a rotatable manner on the shaft (7A). The rotational motion of the slide cam (4) about the axis (O1) is restrained by the case (2), and as a result, the slide cam (4) rotates about the axis (O1) relative to the stationary cam (5) in association with the rotation of the case (2) about O1.

26 Claims, 9 Drawing Sheets

DAMPER

TECHNICAL FIELD

The present invention relates to a damper that provides a more-natural pedal operation feeling, and particularly to structure of a damper that can be easily installed to an existing pedal unit.

BACKGROUND ART

Patent Literature 1 describes an accelerator pedal unit that uses the hysteresis characteristic of a damper having a pair of cams to applies a suitable load to depressing of an accelerator pedal so that excessive depressing of the accelerator pedal is prevented and to reduce the burden on a foot of a driver who holds the accelerator pedal at an almost-constant position.

In this accelerator pedal unit, rotation of an accelerator pedal arm is transmitted to a rotating shaft of the damper through a transmission mechanism including a link member and the like so that bidirectional rotations of the accelerator pedal arm are damped. In detail, one end portion of the link member is fixed to the rotating shaft of the damper so that rotation of the link member causes rotation of the rotating shaft of the damper. On the other hand, an engaging member is fixed to the accelerator pedal arm at its opposite end portion across a rotating shaft of the accelerator pedal arm from the accelerator pedal. This engaging member is slidably held by the link member. Because of this, when the accelerator pedal arm rotates, the rotating shaft of the damper is rotated through the link member in the direction depending on the rotational direction of the accelerator pedal. Owing to the hysteresis characteristic of the damper, an appropriate load is given at the time of depressing the accelerator pedal while the load is reduced at the time of return of the accelerator pedal.

CITATION LIST

Patent Literature

Patent Literature 1: Japanese Unexamined Patent Application Laid-Open No. 2002-12052, FIGS. 13-18.

SUMMARY OF INVENTION

Technical Problem

Sometimes, there arises a demand for retrofitting a damper also to an existing pedal unit such as an accelerator pedal unit or a brake pedal. In the case of an existing pedal unit, however, it is often difficult to retrofit a damper due to space or structure restrictions. For example, in the case that a pedal arm of an existing pedal unit is not provided with a means to fix the transmission mechanism described in Patent Literature 1, such as the case that a pedal arm of the existing pedal unit is not sufficiently extended at its end opposite to the pedal from the position of the rotating shaft, it is difficult to retrofit a damper by using the structure similar to the accelerator pedal unit described in Patent Literature 1.

Further, for installing the damper of the accelerator pedal unit described in Patent Literature 1, it is necessary to connect the transmission mechanism such as the link member to the rotating shaft of the damper and the accelerator pedal arm.

The present invention has been made considering the above state, and an object of the invention is to provide a damper that can be easily installed to an existing pedal unit.

Solution to Problem

To solve the above problems, the present invention provides a case of a damper with a projecting portion for receiving force in the direction of rotating the case in the rotational direction about the axis. Of a pair of members that are housed in the case and generate torque by relative rotation about the axis, one member is made to rotate relative to the other member in the rotational direction about the axis, associated with rotation of the case about the axis.

For example, the present invention provides a damper for generating torque in a rotational direction about an axis comprising: a torque generation mechanism comprising a pair of members that rotate relative to each other in the rotational direction about the axis, to generate torque in the rotational direction about the axis; and a case that houses the torque generation mechanism; an outer peripheral surface of the case being provided with a projecting portion for receiving force in a direction of rotating the case in the rotational direction about the axis; and of the pair of members, one member rotating relative to the other member in the rotational direction about the axis, associated with rotation of the case about the axis.

Advantageous Effects of Invention

According to the present invention, the outer peripheral surface of the case of the damper is provided with the projecting portion for receiving force that rotates the case of the damper in the rotational direction about the axis. Thus, by placing the damper in the space under the pedal arm (the space in the direction toward which the pedal arm is depressed), and fixing the jig, which comes in contact with the projecting portion, on the under surface of the pedal arm, the damper can be easily installed to an existing pedal arm unit.

DESCRIPTION OF EMBODIMENTS

Now, embodiments of the present invention will be described referring to the accompanying drawings.

First, structure of a damper 1 of an embodiment will be described. Here, a damper suitable for retrofitting to a brake pedal unit 12 of an automobile is taken as an example.

Figure 1:
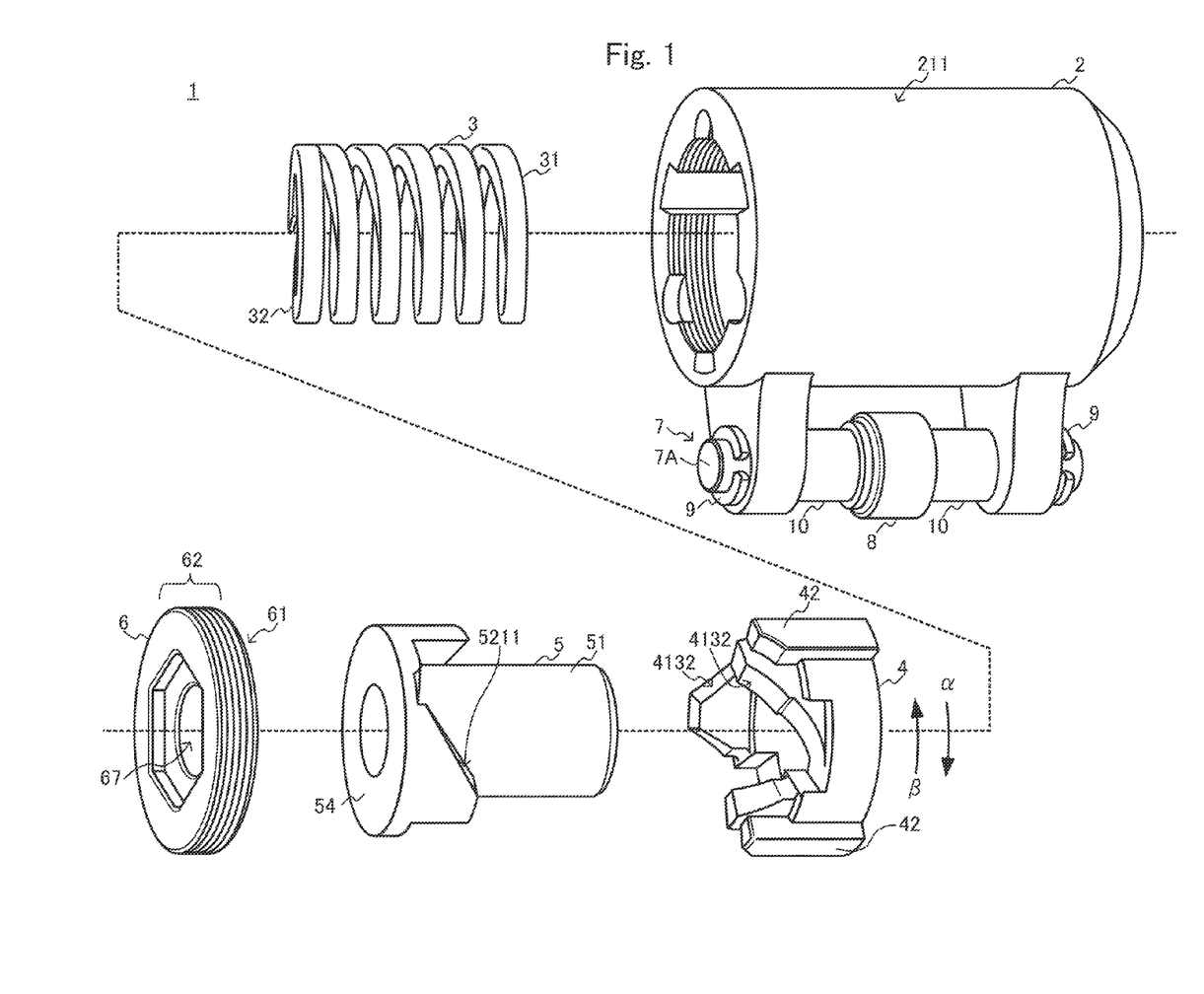
FIG. 1 is an exploded view showing a damper 1 of one embodiment of the invention.
Figure 2:
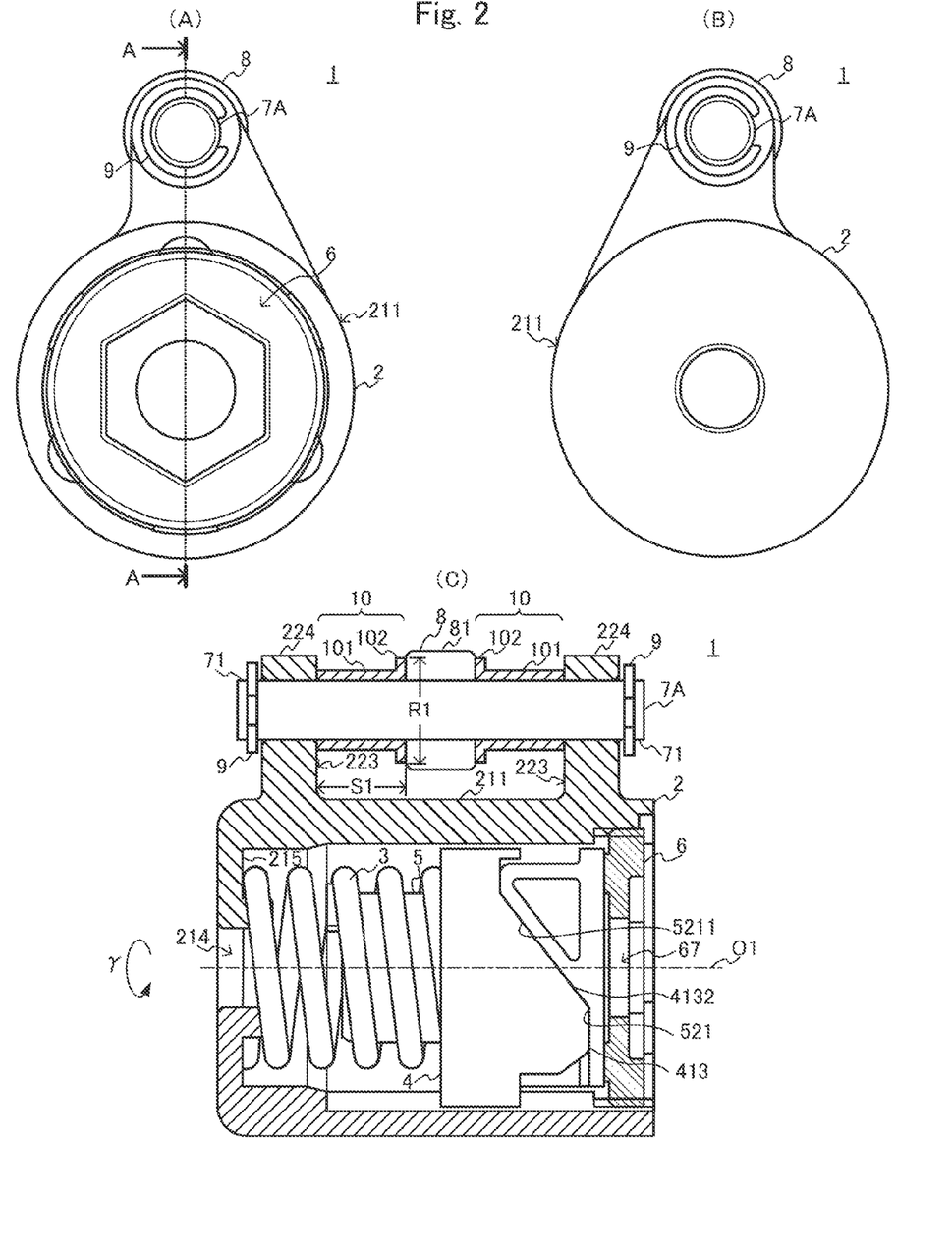
FIGS. 2(A) and 2(B) are left and right side views showing the damper 1 in the initial state (i.e. the state where the brake pedal is not pressed)
FIG. 2(C) is an A-A cross-section of FIG. 2(A)

FIG. 1 is an exploded view showing the damper 1 of one embodiment of the present invention: FIGS. 2(A) and 2(B) are left and right side view of the damper 1 in the initial state (i.e. the state where the brake pedal is not depressed): and FIG. 2(C) is an A-A cross-section of FIG. 2(A).

As shown in the figures, the damper 1 of the present embodiment 1 comprises: a pair of cams (a slide cam 4 and a stationary cam 5) whose sloped cam surfaces 4132, 5211 come in sliding contact with each other by their relative rotation; a coiled spring 3 for biasing the slide cam 4 in the direction of pressing the sloped cam surfaces 4132 of the slide cam 4 against the sloped cam surfaces 5211 of the stationary cam 5; a case 2 for housing these elements 3-5; a circular cover 6 for sealing the case 2; and a projecting portion 7 provided on the outer peripheral surface 211 of the case 2 for receiving force in the direction of rotating the case 2 about an axis O1. The damper 1 of the present invention comprises a metallic shaft 7A as the projecting portion 7, held at a position away from the outer peripheral surface 211 of the case 2 (case body 21), and further comprises: a resin roller 8 inserted into the shaft 7A in a rotatable manner; two flanged bushes 10 for preventing movement of the roller 8 along the shaft 7A; and retaining rings 9, such as E-rings, for fixing the shaft 7A.

Inside the case 2 sealed by the cover 6, the slide cam 4 and the stationary cam 5 are fitted together such that the respective cam surfaces 413 and 521 engage with each other, and the coiled spring 3 is placed between the rear surface (the surface on the other side from the cam surface 413) of the slide cam 4 and the bottom surface 215 of the case 2 so as to press the sloped cam surfaces 4132 of the slide cam 4 against the sloped cam surfaces 5211 of the stationary cam 5. In the initial state of the damper 1, the coiled spring 3 has been preloaded such that the sloped cam surfaces 4132 of the slide cam 4 are biased by the coiled spring 3 to be placed in a predefined position (initial position) relative to the sloped cam surfaces 5211 of the stationary cam 5.

Here, when rotational motion of the stationary cam 5 about the axis O1 is restrained by connecting the stationary cam 5 to an external damper fixing shaft 11 and further the slide cam 4 is rotated about the axis O1 in a predetermined direction α, then the slide cam 4 moves in a direction away from the stationary cam 5 along a cam guide portion 51 of the stationary cam 5 while its sloped cam surfaces 4132 are sliding on the sloped cam surfaces 5211 of the stationary cam 5. During this, the coiled spring 3 is compressed furthermore and the sloped cam surfaces 4132 of the slide cam 4 is more-strongly pressed against the sloped cam surfaces 5211 of the stationary cam 5, to increase the frictional resistance between the sloped surfaces and so forth gradually. Accordingly, as the angle of rotation of the slide cam 4 about the axis O1 becomes larger, the torque on the slide cam 4 in the rotational direction γ about the axis O1 increases gradually.

Here, once the rotation of the slide cam 4 is stopped, the sloped cam surfaces 4132 of the slide cam 4 rest on the sloped cam surfaces 5211 of the stationary cam 5. At this time, the frictional resistance is generated in the direction of preventing extension of the coiled spring 3, and the torque on the slide cam 4 in the rotational direction γ about the axis O1 decreases rapidly.

Further, when the slide cam 4 is rotated in the direction β reverse to the above-mentioned predetermined direction α, then the slide cam 4 moves along the cam guide portion 51 of the stationary cam 5 toward the initial position relative to the sloped cam surfaces 5211 of the stationary cam 5 while its sloped cam surfaces 4132 are sliding on the sloped cam surfaces 5211 of the stationary cam 5. During this, the coiled spring 3 returns gradually, and frictional resistance between the sloped cam surfaces 4132 of the slide cam 4 and the respective sloped cam surfaces 5211 of the stationary cam 5 and so forth decreases gradually. Accordingly, as the angle of rotation of the slide cam 4 about the axis O1 becomes smaller, the torque on the slide cam 4 in the rotational direction about the axis O1 decreases gradually.

The above-described damper 1 has the hysteresis characteristic suitable for using as a hysteresis generating mechanism (hysteresis unit) that gives a moderate load to depressing of a brake pedal 124 (See FIG. 9) and reduce the load while the brake pedal 124 is held at a constant position. By installing the damper 1 to the brake pedal unit 12, it is possible to generate natural brake force and at the same time to realize natural pedal operation feeling.

Next, the elements 2-10 as components of the damper 1 will be described.

Figure 3:
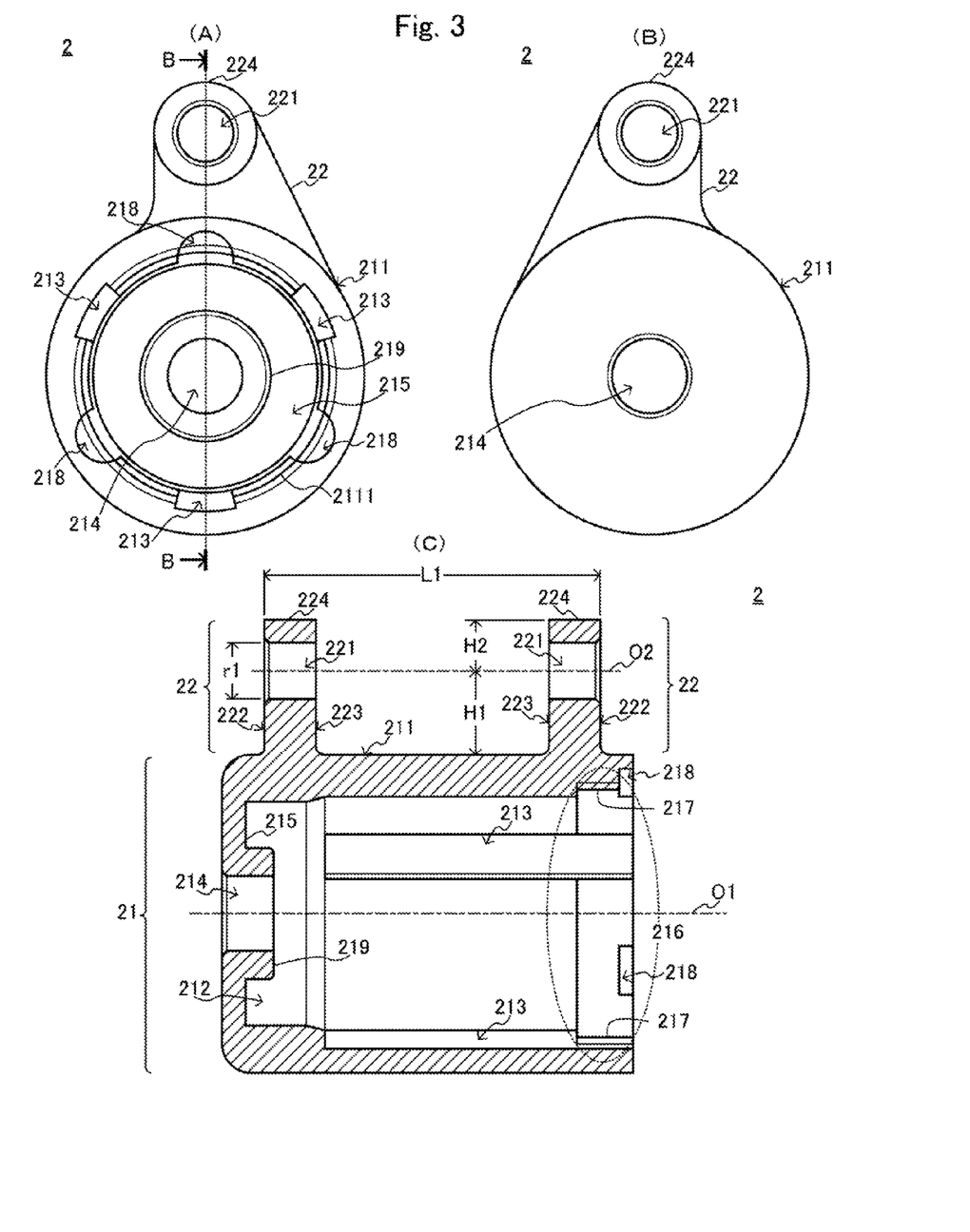
FIGS. 3(A) and 3(B) are left and right side views showing a case 2.
FIG. 3(C) is a B-B cross-section of FIG. 3(A)

FIGS. 3(A) and 3(B) are left and right side views showing the case 2, and FIG. 3(C) is a B-B cross-section of FIG. 3(A).

As shown in the figure, the case 2 comprises: a case body 21 of a bottomed cylindrical shape; and two arm portions 22 for holding the shaft 7A at the position away from the outer peripheral surface 211 of the case body 21.

The opening 216 of the case body 21 is fitted with the cover 6. In the inner peripheral surface of the opening 216, is formed a threaded portion 217 into which a threaded portion 62 in the outer peripheral surface 61 of the cover 6 is screwed. When the threaded portion 62 in the outer peripheral surface 61 of the cover 6 is screwed into this threaded portion 217, the cover 6 is fitted in the opening 216 of the case body 21 while preloading the coiled spring 3 housed in the case body 21. Further, in the edge portion of the case body 21, a plurality of welding recesses 218 are formed nearly at regular angular intervals about the axis O1 of the case body 21 in order to fix the cover 6 fitted in the opening 21.

In a central area of the bottom surface 215 of the case body 21, are formed a through-hole 214 through which the axis O1 of the case body 21 passes, and a spring guide portion 219 encircling the outer periphery of the through-hole 214. The spring guide portion 219 is fitted into the coiled spring 3 that is inserted into the case body 21, to fix the position of one end portion 31 of the coiled spring 3. Further, after assembling of the damper 1, the damper fixing shaft 11 (See FIG. 9) fixed to a bracket of the brake pedal unit 12 is inserted through a through-hole 67 of the cover 6, passes through the insides of the stationary cam 5 and the coiled spring 3, and comes out from the through-hole 214 toward the outside of the case body 21. Here, for example retaining rings or the like are used to prevent dropping out of the damper fixing shaft 11.

In the inner peripheral surface 212 of the case body 21, are formed three grooves 313 along the direction of the axis O1 of the case body 21 nearly at regular angular intervals around the axis O1 of the case body 21. One end of each groove 213 passes through the end surface around the opening 216 of the case body 21 so that protrusions 42 of the slide cam 4 are slidably inserted into the grooves 231 when the slide cam 4 is inserted through the opening 216 of the case body 21. As a result, rotation of the slide cam 4 relative to the case 2 is restrained, and the slide cam 4 is rotated in rotational direction about the axis O1 of the case body 21 when the case 2 is rotated.

In the present embodiment, three grooves 213 are formed in the inner peripheral surface 212 of the case body 21 at regular angular intervals. However, the number and layout of grooves 213 are determined according to the number and layout of the protrusions 42 of the slide cam 4 to use.

Two arm portions 22 are formed integrally with the case body 21 on the outer peripheral surface 211 of the case body 21, being aligned along the axis O1 of the case body 21. In these arm portions 22, respective through-holes 221 as holes through which the shaft 7A is inserted are formed oppositely to each other at a predetermined height H1 above the outer peripheral surface 211 of the case body 21. By these through-holes 221, the shaft 7A is held along the axis O1 of the case body 21 at the predetermined height H1 above the outer peripheral surface 211 of the case body 21. As described below, for the height H1 at which the shaft 7A is held, is set a larger height than the radius of the roller 8 so that the outer peripheral surface 81 of the roller 8 fitted on the shaft 7A does not get into touch with the outer peripheral surface 211 of the case body 21.

Figure 4:
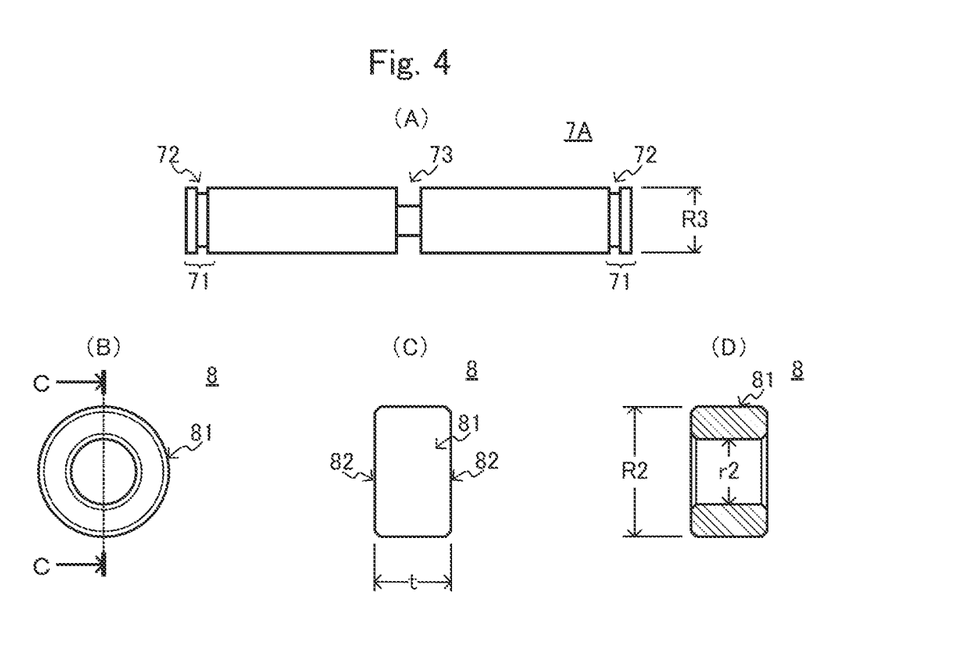
FIG. 4(A) is a front elevation showing a shaft 7A.
FIGS. 4(B) and 4(C) are a front elevation and a side view showing a roller 8.
FIG. 4(D) is a C-C cross section of FIG. 4(B)

FIG. 4(A) is a front elevation showing the shaft 7A.

The shaft 7A is longer than the distance L1 between the outer side surfaces 222 (the surfaces respectively on the sides opposite to the inner side surfaces 223 facing each other) of the two arm portions 22 of the case 2. Accordingly, when the shaft 7A is inserted through the through-holes 221 of the two arm portions 22, both end portions 71 of the shaft 7A protrude out of the outer side surfaces 222 through the through-holes 221 of the two arm portions 22. In the end portions 71 of the shaft 7A, respective grooves 72 are formed in a circumferential direction. The two retaining rings 9 are fitted in these grooves 72 respectively, to prevent falling of the shaft 7A off the through-holes 221 of the two arm portions 22. Although the present embodiment uses the retaining rings 9 for preventing falling-off of the shaft 7A, other parts, for example bushing nuts, for preventing falling-off of the shaft 7A may be used instead of the retaining rings 9.

Further, in the outer peripheral surface of the shaft 7A, a notch 73 is formed at a position between the inner side surfaces 223 of the two arm portions 22 of the case 2. This makes a fragile portion of a small cross-sectional area in the shaft 7A. The size of the notch 73 is determined such that the shaft 7A breaks at this notch 73 when force of the predetermined magnitude is applied. Providing the shaft 7A with such a fragile portion yields the following result: that is to say, if there should happen a failure in rotation of the damper 1 due to, for example, fixing of the sloped cam surfaces 4132 and 5211, the shaft 7A breaks at the fragile portion (the notch 73) being subject to force applied through a jig 122 of the brake pedal arm 125 and the roller 8 when the driver depresses the brake pedal 124 by force of predetermined magnitude or larger. Thus a brake pedal arm 125 can rotate in the direction of depressing the brake pedal 124. Owing to employing such fail-safe, if a failure should arise in rotation of the damper 1, the driver can depress harder on the brake pedal 124.

In the present embodiment, the fragile portion (the notch 73) is formed in the shaft 7A. However, fragile portions such as notches may be formed in the outer side surfaces 222 and the inner side surfaces 223 of the two arm portions 22 and others, so that the arm portions 22 break at the fragile portions when force of the predetermined magnitude is applied. In the case the fragile portions of such arm portions 22 are formed, for example, if a failure should arise in rotation of the damper 1 due to adhesion of the sloped cam surfaces 4132 and 5211 or the like, the arm portions 22, which hold the shaft 7A, break at the fragile portions being subject to force applied from the jig 122 of the brake pedal arm 125 through the shaft 7A when the driver depresses the brake pedal 124 by force of predetermined magnitude or larger. Or, a fragile portion such as a notch may be formed in the damper fixing shaft 11, so that the damper fixing shaft 11 breaks at the fragile portion when the damper fixing shaft 11 is twisted by force of predetermined magnitude. For example, with this fragile portion being provided in the damper fixing shaft 11, if a failure should arise in rotation of the damper 1 due to adhesion of the sloped cam surfaces 4132 and 5211 or the like, the fragile portion of the damper fixing shaft 11 breaks due to twist when the driver depresses the brake pedal 124 by force of predetermined magnitude or larger. In any of these cases, the cover 6 becomes rotatable relative to the damper fixing shaft 11, and the driver can depress harder on the brake pedal 124.

FIGS. 4(B) and 4(C) are a front elevation and a side view showing the roller 8; and FIG. 4(D) is a C-C cross-section of FIG. 4(B).

The roller 8 has a cylindrical shape of the inner diameter r2 larger than the outer diameter R3 of the shaft 7A. The shaft 7A is inserted into the roller 8 and holds the roller 8 rotatably. In this state, rolling contact between the jig 122, which is fixed on the under surface 123 of the brake pedal arm 125, and the outer peripheral surface 81 of the roller 8 causes the roller 8 to rotate around the shaft 7A. Thus, because the outer peripheral surface 81 of the roller 8 is in rolling contact with the jig 122 fixed to the brake pedal arm 125, it is possible to prevent generation of backlash due to unsymmetrical wearing of the roller 8 even if the roller 8 is made of resin for preventing generation of a strange sound.

Here, the radius (½ of the outer diameter R2) of the roller 8 is larger than the distance H2 from the axis O2 of the through-hole 221 of each arm portion 22 to the tip end portion 224 of that arm portion 22, and smaller than the distance H1 from the axis O2 of the through-hole 221 of each arm portion 22 to the outer peripheral surface 211 of the case body 21. Accordingly, the outer peripheral surface 81 of the roller 8 projects over the tip end portions 224 of the arm portions 22 (See FIG. 2(C)), and thus the tip end portions 224 of the arm portions 22 do not prevent the rolling contact between the jig 122 fixed on the under surface 123 of the brake pedal arm 125 and the outer peripheral surface 81 of the roller 8, and the outer peripheral surface 81 of the roller 8 held by the shaft 7A does not touch the outer peripheral surface 211 of the case body 21 (See FIG. 2(C)). Thus, the roller 8 rotate smoothly by the rolling contact between the jig 122 fixed on the under surface 123 of the brake pedal arm 125 and the outer peripheral surface 81 of the roller 8. Thickness t of the roller 8 can be determined depending on, for example, the shape size of the jig 122 to be fixed on the under surface 123 of the brake pedal arm 125.

In the present embodiment, the outer peripheral surface 81 of the roller 8 is made to be spaced from the outer peripheral surface 211 of the case body 21. However, the outer peripheral surface 81 of the roller 8 can be made to touch the outer peripheral surface 211 of the case body 21 so as to use also, as the damping force of the damper, the frictional resistance between the outer peripheral surface 211 of the case body 21 and the outer peripheral surface 81 of the roller 8.

As shown in FIG. 2(C), each of the two flanged bushes 10 comprises: a cylindrical portion 101 of length corresponding to the distance S1 between the roller 8 and one arm portion 22; and a flange 102 of a disk shape projecting from the outer peripheral surface at one end of the cylindrical portion 101. The cylindrical portion 101 has the inner diameter larger than the outer diameter R3 of the shaft 7A so that the shaft 7A can be inserted into the inside of the cylindrical portion 101, and has the outer diameter larger than the inner diameter r1 of the through-hole 221 of each arm portion 22 so that the shaft 7A does not fall off the through-holes 221 of the arm portions 22. As for one flanged bush 10, the shaft 7A is inserted into its cylindrical portion 101 in a state that its flange 102 faces one side surface 82 of the roller 8, so that the flanged bush 10 is placed between the inner side surface 223 of one arm portion 22 and the one side surface 82 of the roller 8. As for the other flange bush 10, the shaft 7A is inserted into its cylindrical portion 101 in a state that its flange 102 faces the other side surface 82 of the roller 8, so that the flanged bush 10 is placed between the inner side surface 223 of the other arm portion 22 and the other side surface 82 of the roller 8. As a result, the roller 8 is prevented from moving along the shaft 7A by the flanges 102 of the flanged bushes 10 on both sides. Further, the outer diameter R1 of the flange 102 of each flanged bush 10 is made to be smaller than the outer diameter R2 of the roller 8, not to prevent contact between the jig 122 fixed on the under surface 123 of the brake pedal arm 125 and the outer peripheral surface 81 of the roller 8.

Figure 5:
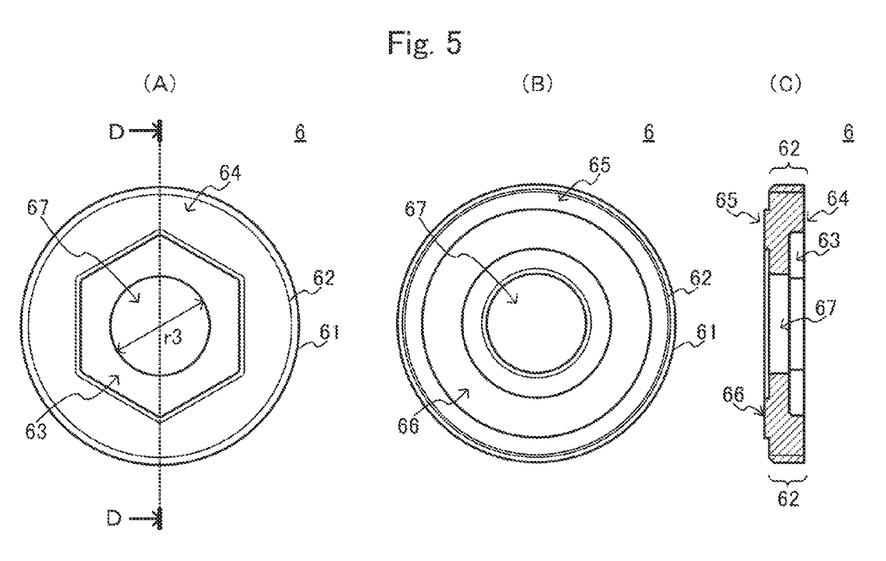
FIGS. 5(A) and 5(B) are a front elevation and a side view of a cover 6.
FIG. 5(C) is a D-D cross section of FIG. 5(A)

FIGS. 5(A) and 5(B) are a front elevation and a side view of the cover 6: and FIG. 5(C) is a D-D cross-section of FIG. 5(A).

In the outer peripheral surface 61 of the cover 6, is formed the threaded portion 62, which is screwed in the threaded portion 217 formed in the opening 216 of the case body 21. In one side 64 (the surface to be directed toward the outside of the case body 21) of the cover 6, is formed a hexagonal hole 63 for inserting a tool for rotating the cover 6 relative to the case body 21. And in the other side 65 (the rear surface to be directed toward the inside of the case body 21) of the cover 6, is formed a bearing surface 66 with which the bottom surface 54 of the stationary cam 5 is to come in contact. When the threaded portion 62 formed in the outer peripheral surface 61 of the cover 6 is screwed into the threaded portion 217 formed in the opening 216 of the case body 21, the bottom surface 54 of the stationary cam 5 is pressed by the bearing surface 66 of the cover 6. As a result, the stationary cam 5 and the slide cam 4 are pressed into an initial position in the case body 21, and the coiled spring 3 is preloaded between the bottom surface 215 of the case body 21 and the slide cam 4.

Further, in a central area of the cover 6, is formed the through-hole 67 having the inner diameter r3 larger than the outer diameter of the damper fixing shaft 11. In the damper 1 in an assembled state, the axis O1 of the case body 21 passes through this through-hole 67 and the through-hole 214 of the bottom surface 215 of the case body 21 via the inside of the stationary cam 5 (See FIG. 2(C)). The damper fixing shaft 11 is inserted from this through-hole 67 through the through-hole 214 in the bottom surface 215 of the case body 21 via the inside of the stationary cam 5.

Figure 6:
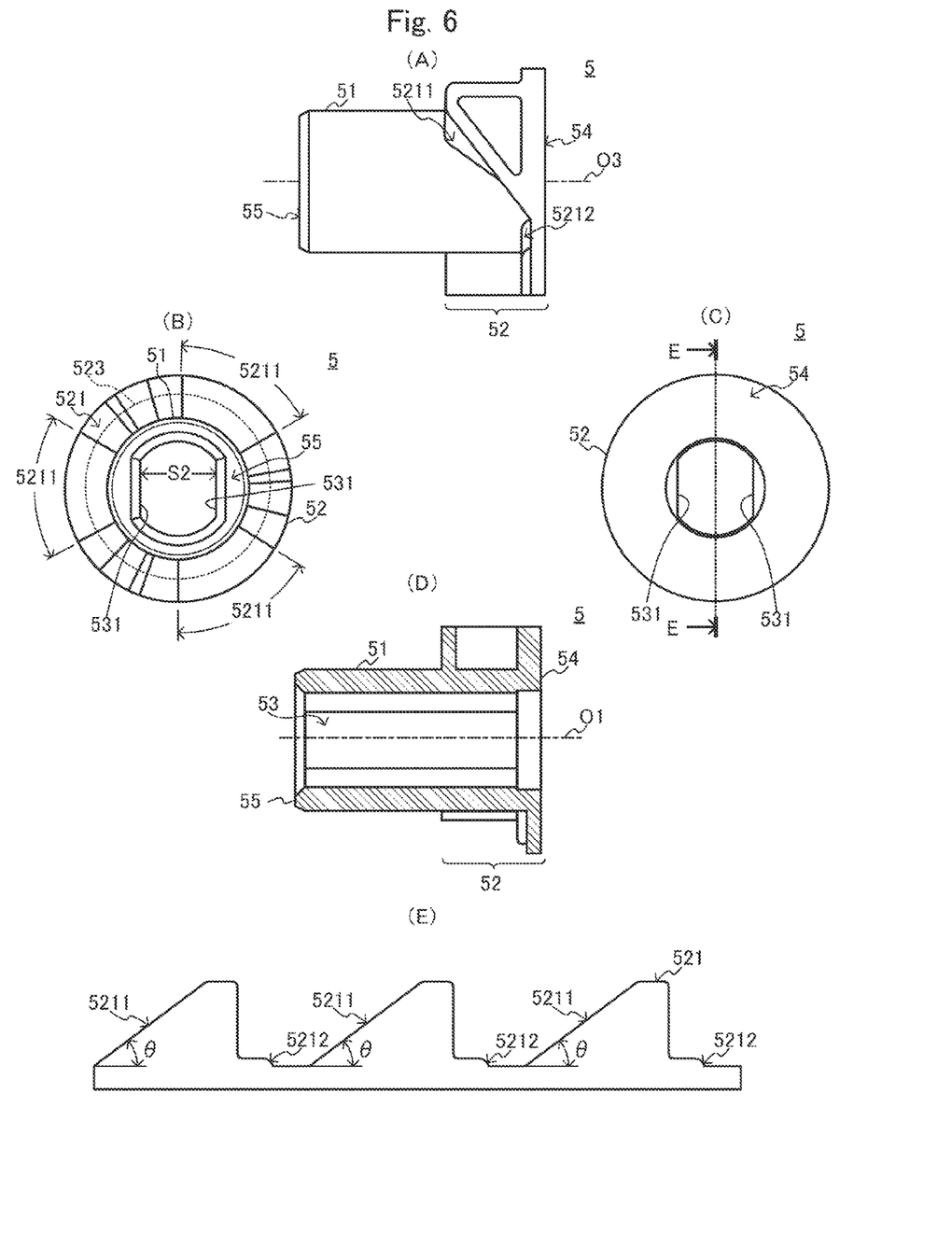
FIGS. 6(A), 6(B) and 6(C) are a front elevation and left and right side views showing a stationary cam 5.
FIG. 6(D) is an E-E cross-section of FIG. 6(C)
FIG. 6(E) is a view showing schematically a profile shape of a cam surface 521 on a pitch circle 523.

FIGS. 6(A), 6(B) and 6(C) are a front elevation and left and right side views showing the stationary cam 5: FIG. 6(D) is an E-E cross-section of FIG. 6(C): and FIG. 6(E) is a view showing schematically a profile shape of a cam surface 521 on a pitch circle 523.

As shown in the figures, the stationary cam 5 has a stepped cylindrical shape in which a small diameter portion 51 and a large diameter portion 52 are formed integrally. The small diameter portion 51 is the cam guide portion 51 that is inserted into the slide cam 4 as an inner diameter guide for the slide cam 4. And, the large diameter portion 52 is a cam portion 52 having the sloped cam surfaces 5211 on which the sloped cam surfaces 4132 of the slide cam 4 slides.

As described above, the damper fixing shaft 11, which passes through the through-hole 67 of the cover 6, is inserted into the inside of the stationary cam 5 in the direction from the end surface 54 toward the other end surface 55. In the inner peripheral surface 53 of the stationary cam 5, are formed opposed flat surfaces 531. And, the outer peripheral surface of the damper fixing shaft 11 is flat chamfered to have two flat surfaces on the end side such that the width across flats corresponds to the distance S2 between those two flat surfaces 531. Accordingly, when the damper fixing shaft 11 is inserted into the stationary cam 5, rotation of the stationary cam 5 relative to the damper fixing shaft 1 is prevented.

Figure 8:
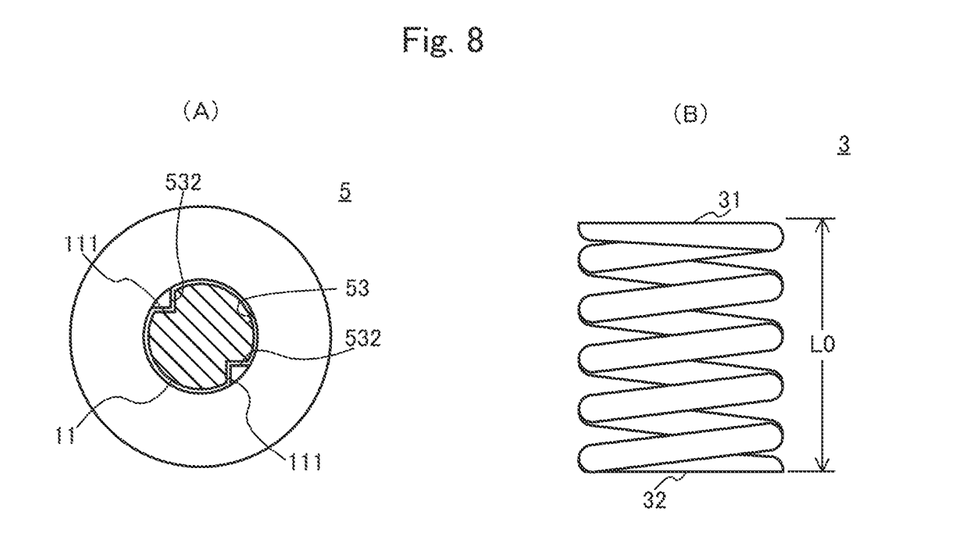
FIG. 8(A) is a right side view showing a stationary cam 5 of another embodiment of the present invention.
FIG. 8(B) is a front elevation showing a coiled spring 3.

In the present embodiment, in order to prevent relative rotation of the damper fixing shaft 11 to the stationary cam 5, the outer peripheral surface of the end portion of the damper fixing shaft 11 is flatted to have two flat surfaces, and the opposed flat surfaces 531 are formed in the inner peripheral surface 53 of the stationary cam 5. However, it is not needed to do this in any case. It is sufficient that the outer peripheral surface of the end portion of the damper fixing shaft 11 and the inner peripheral surface 53 of the stationary cam 5 have respective surfaces that interfere with each other. For example, a cross-sectional shape of the end portion of the damper fixing shaft 11 and a contour shape of the inner periphery of the stationary cam 5 may be both polygonal. Alternatively, it may be sufficient that, as shown in FIG. 8(A), one or more recesses 111 are formed in the damper fixing shaft 11 and a protrusion 532 to be fitted in any of these recesses 111 is formed in the inner peripheral surface 53 of the stationary cam 5. In this case, it is possible to arrange that force from the damper fixing shaft 11 breaks the protrusion 532 of the inner peripheral surface 53 of the stationary cam 5 when force of a predetermined magnitude is given from the jig 122 of the brake pedal arm 125 to the roller 8. Then, the protrusion 532 of the inner peripheral surface 53 of the stationary cam 5 and the recess 111 of the damper fixing shaft 11 can be made to function not only as a rotation-preventing mechanism for the stationary cam 5 but also as a fail-safe mechanism.

The cam surface 521 (the surface on the side of the cam guide portion 51) of the cam portion 52 repeats a concave and a convex periodically in the direction of the axis O1 on the pitch circle 523 about the axis O1. In detail, in this cam surface 21, the sloped cam surfaces 5211 are formed at three positions nearly at regular angular intervals about the axis O1, being sloped at a predetermined angle θ with the pitch circle 523, and stepped surfaces 5212 for determining the initial position of the sloped cam surfaces 4132 of the slide cam 4 are formed between adjacent sloped cam surfaces 5211.

Figure 7:
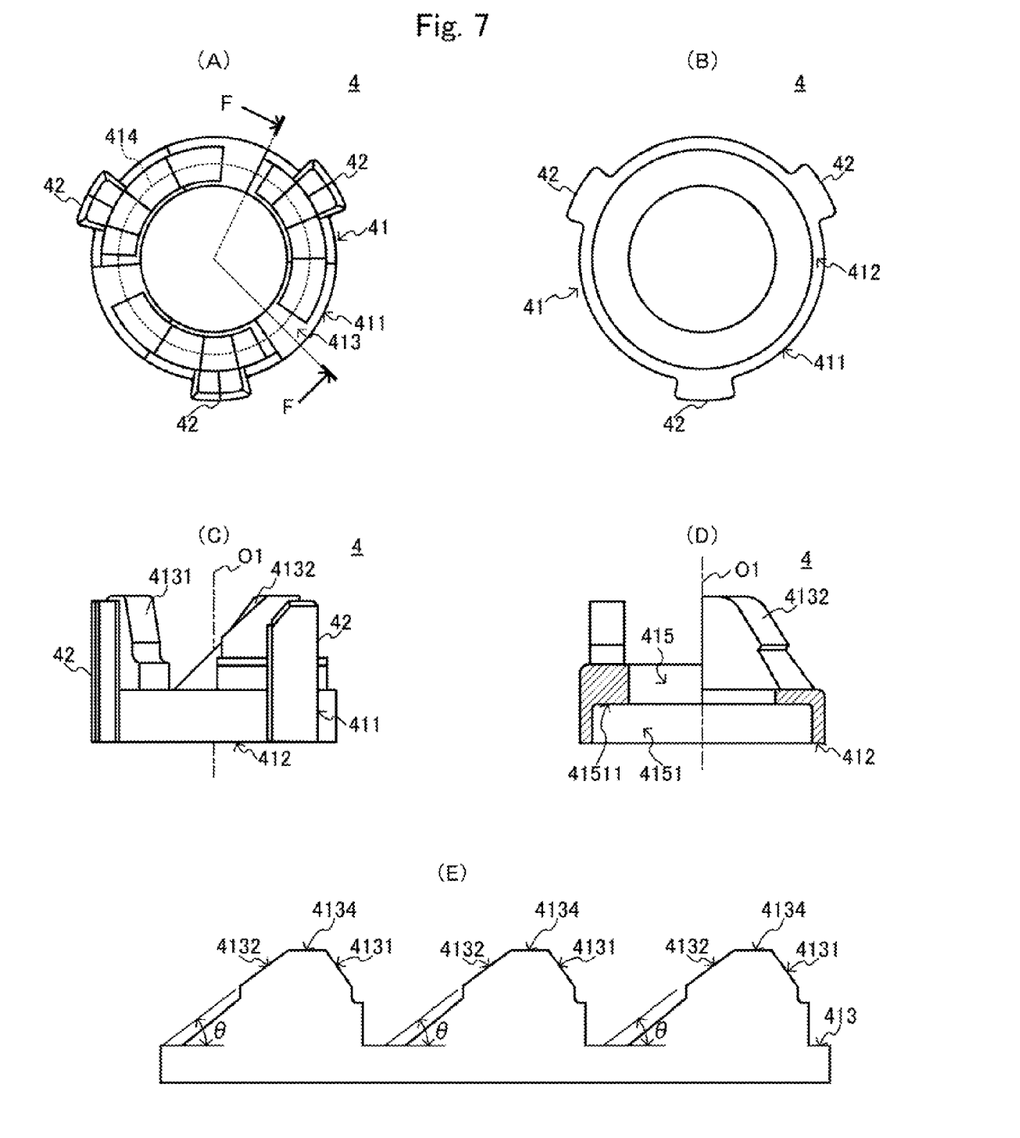
FIGS. 7(A), 7(B) and 7(C) are a front elevation, a back elevation and a side view showing a slide cam 4.
FIG. 7(D) is an F-F cross-section of FIG. 7(A)
FIG. 7(E) is a view showing schematically a profile shape of a cam surface 413 on a pitch circle 414.

FIGS. 7(A), 7(B) and 7(C) are a front elevation, a back elevation and a side view showing the slide cam 4: FIG. 7(D) is an F-F cross-section of FIG. 7(A): and FIG. 7(E) is a view showing schematically a profile shape of the cam surface 413 on a pitch circle 414.

The slide cam 4 comprises: a cam portion 41 of a cylindrical shape into which the cam guide portion 51 of the stationary cam 5 is inserted; and protrusions 42 formed in an outer peripheral surface 411 of the cam portion 41 along the axis O1 of the cam portion 41.

In the inner periphery of the cam portion 41, is formed a stepped hole 415 having a large diameter portion 4151 on the side of the one end surface (bottom surface) 412 of the cam portion 41. The large diameter portion 4151 is a guide hole for receiving the other end portion 32 of the coiled spring 3.

A cam surface (the other end surface) 413 of the cam portion 41 repeats a concave and a convex periodically in the direction of the axis O1 on the pitch circle 414 about the axis O1. In detail, in this cam surface 413, the sloped cam surfaces 4132 are formed at three positions nearly at regular angular intervals about the axis O1, being sloped at the prescribed angle θ with the pitch circle 414. And, for each sloped cam surface 4132, is formed a flat side 4134 following the sloped cam surface 4132, and further is formed a stepped surface 4131 that comes in contact with the stepped surface 5212 in the cam surface 521 of the stationary cam 5.

When the cam guide portion 51 of the stationary cam 5 is inserted into the inside of the cam portion 41 in a state that the cam surface 413 of the cam portion 41 faces the cam surface 521 of the stationary cam 5, the tip end 55 of the cam guide portion 51 of the stationary cam 5 projects from the side of the bottom surface 412 of the cam portion 41. The coiled spring 3 is fitted on the cam guide portion 51 projecting from the side of the bottom surface 412 of the cam portion 41, and the end portion 32 of the coiled spring 3 is housed in the spring guide hole 4151 in the cam portion 41. The coiled spring 3, the slide cam 4 and the stationary cam 5, which have been assembled as described, are housed in the opening 216 of the case body 21 with the side of the end portion 31 of the coiled spring 3 first, aligning the protrusions 42 of the slide cam 4 with the respective grooves 231 of the case body 21. When, in this state, the cover 6 is screwed in the opening 216 of the case body 21, the coiled spring 3 is preloaded between the bottom surface 215 of the case body 21 and a bottom surface 41511 of the guide hole 4151 of the slide cam 4. Accordingly, the slide cam 4 is biased in the direction of pressing the sloped cam surfaces 4132 of the slide cam 4 against the sloped cam surfaces 5211 of the stationary cam 5. By rotation of the slide cam 4 associated with this, the stepped surfaces 4131 in the cam surface 413 of the slide cam 4 come in contact with the respective stepped surfaces 5212 in the cam surface 521 of the stationary cam 5. This position means the initial position of the sloped cam surfaces 4132 in relation to the sloped cam surfaces 5211 of the stationary cam 5.

FIG. 8(B) is a front elevation showing the coiled spring 3.

In the case body 21, the end portion 32 of the coiled spring 3 is in contact with the bottom surface 41511 of the spring guide hole 4151 of the slide cam 4, and the end portion 31 is in contact with the bottom surface 215 of the case body 21 (See FIG. 2(C)). As shown in the figure, in order to realize good seating of both end portions 31 and 32 of the coiled spring 3 at this time, both end portions 31 and 32 of the coiled spring 3 are made to be closed ends that have been subjected to grinding processing.

The free length L0 of the coiled spring 3 is longer than the distance from the bottom surface 215 of the case body 21 to the bottom surface 41511 of the spring guide hole 4151 of the slide cam 4. Accordingly, at the initial position of the brake pedal arm 125, the coiled spring 3 is preloaded by the bottom surface 215 of the case body 21 and the bottom surface 41511 of the spring guide hole 4151 of the slide cam 4.

Next, structure of installing the damper 1 to the brake pedal unit 12 will be described.

Figure 9:
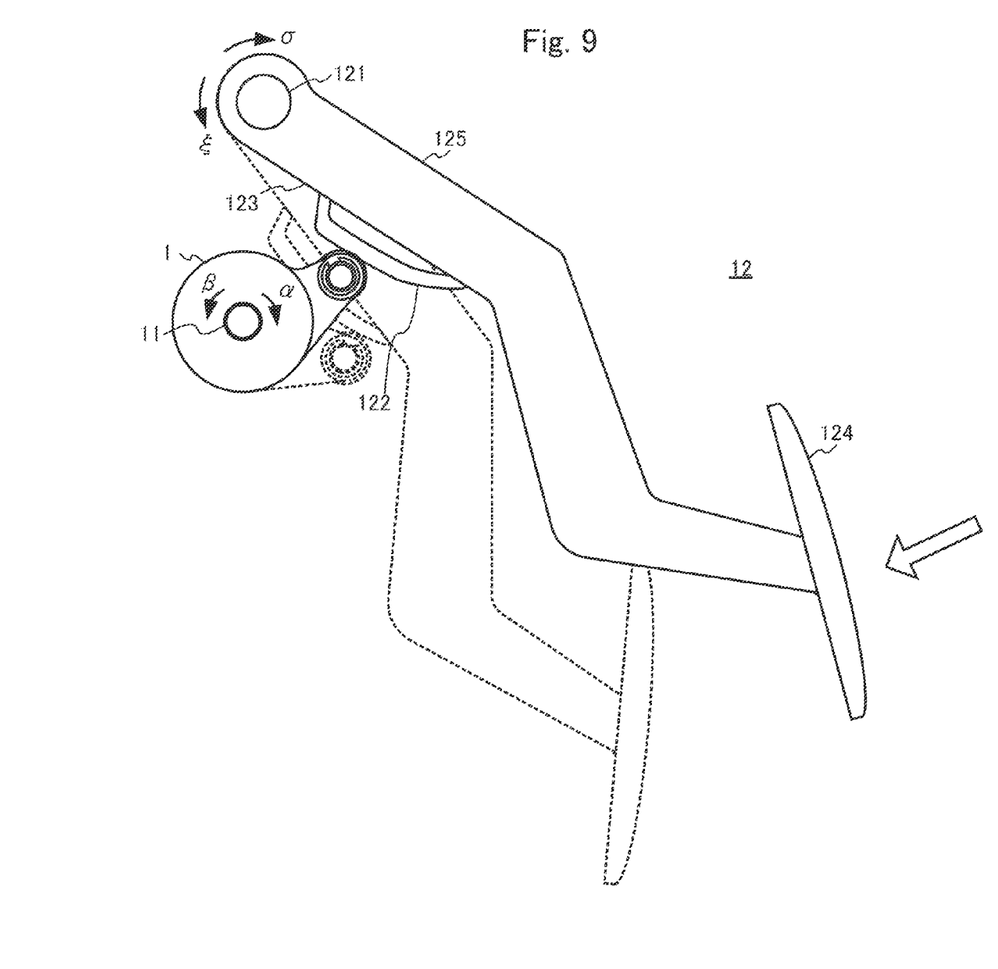
FIG. 9 is a view for explaining structure of installing a damper 1 to a brake pedal unit 12.

FIG. 9 shows structure of installing the damper 1 to the brake pedal unit 12.

When the brake pedal 124 is depressed, the brake pedal arm 125 of the brake pedal unit 12 rotates on a rotating shaft 121 as a fulcrum. The metallic jig 122 is fixed on the under surface 123 of the brake pedal 124.

Further, the damper fixing shaft 11 nearly parallel with the rotating shaft 121 of the brake pedal arm 125 is fixed to a bracket (not shown in the present embodiment), to which the brake pedal unit 12 is fixed, at a predetermined distance from the location where the rotating shaft 121 is fixed, so that the damper fixing shaft 11 is positioned below the brake pedal arm 125. This damper fixing shaft 11 is inserted from the through-hole 67 of the cover 6 toward the bottom surface 215 of the case body 21 such that the damper fixing shaft 11 passes through the inside of the stationary cam 5 in the inside of the case body 21. In the inner peripheral surface 53 of the stationary cam 5, are formed the opposed flat surfaces 531. And, the outer peripheral surface of the damper fixing shaft 11 is flat chamfered to have two flat surfaces on the end side such that the width across flats corresponds to the distance S2 between the two flat surfaces 531. Accordingly, rotation of the stationary cam 5 is restrained by the damper fixing shaft 11, to prevent rotation of the stationary cam 5 relative to the damper fixing shaft 11.

According to the thus-described arrangement, when the brake pedal arm 125 rotates in a predetermined direction σ about the rotating shaft 121 owing to depressing of the brake pedal 124, then the jig 122 on the under surface 123 of the brake pedal arm 125 is in rolling contact with the outer peripheral surface 81 of the roller 8, to give force via the roller 8 to the shaft 7A for rotating the case body 21 in a predetermined direction α about the damper fixing shaft 11. As a result, the case body 21 of the damper 1 rotates in the predetermined direction α about the damper fixing shaft 11. On the other hand, when the brake pedal 124 is released from the depressing, then the resilience of the spring coil 3 rotates the case body 21 of the damper 1 in the direction β reverse to the predetermined direction α about the damper fixing shaft 11, and the roller 8 gives force to rotate the brake pedal arm 125 in the direction ξ reverse to the predetermined direction σ, while the outer peripheral surface 81 of the roller 8 is in rolling contact with the jig 122 on the under surface 123 of the brake pedal arm 125.

Thus, in the damper 1 of the present embodiment, rotational movement of the slide cam 4 about the axis O1 is restrained by the case body 21, and the damper 1 is provided with the shaft 7A on the outer peripheral surface 21 of the case body 21 so as to receive force for rotating the case body 21 about the axis O1. As a result, by fixing the jig 122 on the under surface 123 of the brake pedal arm 125, it is possible to install the damper 1 at a position where the jig 122 presses the shaft 7A in the course of swinging of the brake pedal arm 125. In other words, it is possible to position the axis of the damper 1 under the brake pedal arm 125 away from the rotational shaft of the brake pedal arm 125, and accordingly it is possible to install the damper 1 in a relatively-roomy space under the brake pedal arm 125. Further, by adjusting the fixing position of the jig 122 on the under surface 123 of the brake pedal arm 125, it is possible to change flexibly the position of placing the damper 1. Thus, because there is a lot of flexibility of location of the damper 1, spatial restriction on retrofitting the damper 1 to an existing brake pedal unit 12 is small.

Further, the damper 1 of the present embodiment can be applied to any type of brake pedal arm 125 when the jig 122, which is in rolling contact with the outer peripheral surface 81 of the roller 8 while pushing the shaft 7A, is fixed on the under surface 123 of the brake pedal arm 125, and thus the damper 1 can be used for any shape of the brake pedal arm 125. Further, the range of rotation of the damper 1 can be adjusted by changing the shape of the jig 122 fixed on the under surface 123 of the brake pedal arm 125, and thus the torque about the axis can be adjusted easily. Thus, the damper 1 can be used widely for retrofitting to an existing brake pedal unit 12.

Further, the damper 1 of the present embodiment can be installed by fitting the damper 1 on the damper fixing shaft 11 fixed to the non-shown bracket, without connecting a link member or the like to the brake pedal arm 125. Thus, the damper 1 can be installed by simple operation.

Further, the arm portions 22 are provided on the outer periphery of the case body 2, and thus it is possible to hold the shaft 7A in a location away from the axis O1 of the case body 2 by means of the arm portions 22 even if the case body 2 is kept compact. And thus, the case body 2 can be rotated by smaller force. Thus, although the size of the damper 1 of the present embodiment is compact, the damper 1 can realize natural pedal operation feeling while generating natural brake force.

Such effects can be attained not only in the case of the damper 1 retrofitted to an existing brake pedal unit 12 but also in the case of the damper 1 incorporated into a brake pedal unit 12.

Hereinabove, the present embodiment has taken an example of the damper 1 suitable for retrofitting to a brake pedal unit 12 of an automobile. However the present invention can be also applied to a damper retrofitted to an accelerator pedal of an automobile, and a damper retrofitted to a pedal unit of a musical instrument, a game machine or the like, for example. However, in the case where the invention is applied to a damper retrofitted to an accelerator pedal of an automobile, such a fail-safe mechanism is employed that an accelerator pedal arm is made to return to an initial position when a brake pedal is also depressed during depressing of the accelerator pedal.

Further, the present embodiment has taken an example of application to the damper 1 that damps rotation by using frictional resistance between the sloped cam surfaces 4132, 5211 and so forth of a pair of cams 4 and 5 that rotate relatively to each other. However, the present invention can be widely applied to a damper that damps rotation by using members that rotate relatively. In that case, it is possible to arrange to restrain rotation of one member relative to a case 2, and accordingly the one member is made to rotate relative to the other member when the case 2 rotates.

Further, in the present embodiment, the resin roller 8 is rotatably fitted on the metallic shaft 7A. However, the resin roller 8 may be fixed on the metallic shaft 7A, and then the shaft 7A can be rotatably held by the arm portions 22 of the case 2. Further, instead of the metallic shaft 7A and the resin roller 8, a resin shaft may be rotatably held by the arm portions 22 of the case 2, and then the metallic jig 122 mounted on the under surface 123 of the brake pedal arm 125 can be made to be in contact with the outer peripheral surface of this resin shaft. In that case, the resin shaft may have a large diameter portion for contact with the jig 122. Further, in the case where the jig 122 mounted on the under surface 123 of the brake pedal arm 125 is made of resin or coated by resin, then the jig 122 may be directly contacted with the outer peripheral surface of the rotatably-held metallic shaft 7A without using the resin roller 8. Or, instead of the resin roller 8, a ball bearing may be mounted on the shaft 7A, and then this ball bearing can be made to be in contact with the jig 122.

Further, in the present embodiment, the case 7 holds, as its projecting portion, the shaft 7A for receiving force in the direction of rotating the case 7. However, it is not necessary. It is sufficient that the case 2 has a projecting portion 7 for receiving force in the direction of rotating the case at a position away from the outer peripheral surface 211, without being limited to the shaft 7A. For example, such a projecting portion 7 may be a protrusion given to the case 2 by integral molding or the like, or a protrusion formed by engaging members retrofitted to the case 2.

Further, in the present embodiment, the jig 122 is fixed on the under surface 12 of the brake pedal arm 125, and this jig 122 pushes the shaft 7A while the brake pedal arm 125 swings. However, it is possible that the damper 1 is made to swing together with the brake pedal arm 125, and then a jig or the like placed under the brake pedal arm 125 pushes the shaft 7A.

Further, in the present embodiment, the coiled spring 3 is used for biasing the slide cam 4. However, another elastic body such as rubber or a spring other than a coiled spring may be used.

INDUSTRIAL APPLICABILITY

The present invention can be applied also to use as a damper that can be easily retrofitted to various kinds of pedal units and does not have many spatial and structural restrictions at the time of installation.

REFERENCE SIGNS LIST

1: damper, 2: case, 3: coiled spring, 4: slide cam, 5: stationary cam, 6: cover, 7: projecting portion, 7A: shaft, 8: roller, 9: retaining ring, 10: flanged bush, 11: damper fixing shaft, 12: brake pedal unit, 21: case body, 22: arm portion, 31, 32: end portion of the coiled spring, 41: cam portion, 42: protrusion, 51: cam guide portion (small diameter portion), 52: cam guide portion (large diameter portion), 53: inner peripheral surface of the stationary cam, 54, 55: end surface of the stationary cam, 61: outer peripheral surface of the cover, 62: threaded portion, 63: hexagonal hole, 64: surface of the cover, 65: rear surface of the cover, 66: bearing surface of the stationary cam, 67: through-hole, 71: both end portions of the shaft, 72: groove, 73: notch, 81: outer peripheral surface of the roller, 82: side surface of the roller, 101: cylindrical portion of the flanged bush, 102: flange of the flanged bush, 111: recess in the damper fixing shaft, 121: rotating shaft of brake pedal arm, 122: jig, 123: under surface of the brake pedal arm, 124: brake pedal, 125: brake pedal arm, 211: outer peripheral surface of the case body, 212: inner peripheral surface of the case body, 213: groove, 214: through-hole, 215: bottom surface of the case body, 216: opening of the case body, 217: threaded portion, 218: welding recess, 219: spring guide portion, 221: through-hole of the arm portion, 222, 223: side surface of the arm portion, 224: tip end portion of the arm portion, 411: outer peripheral portion of the cam portion, 412: bottom surface of the cam portion, 413: cam surface, 414: pitch circle, 415: stepped hole, 521: cam surface, 523: pitch circle, 531: opposed surfaces in the inner periphery of the stationary cam, 532: protrusion in the inner peripheral surface of the stationary cam, 4131: stepped surface, 4132: sloped cam surface, 4134: flat side, 4151: spring guide hole, 5211: sloped cam surface, and 5212: stepped surface.

The invention claimed is:

1. A damper for generating torque in a rotational direction about an axis, comprising:
    a torque generation mechanism comprising a first member and a second member that rotate relative to each other in the rotational direction about the axis, to generate torque in the rotational direction about the axis;
    a case housing the torque generation mechanism;
    an outer peripheral surface of the case being provided with a projecting portion for receiving force in a direction of rotating the case in the rotational direction about the axis;
    the first member rotating relative to the second member in the rotational direction about the axis, associated with rotation of the case about the axis; and
    the projecting portion being a shaft mounted on the case so as to receive the force in the direction of rotating the case in the rotational direction about the axis.

2. A damper of claim 1, wherein:
    the damper further comprises a rotating body into which the shaft is rotatably inserted;

the shaft is placed along a direction of the axis, away from the outer peripheral surface of the case; and the shaft receives the force in the direction of rotating the case in the rotational direction about the axis, through the rotating body.

3. A damper of claim 2, wherein:

the case has a cylindrical shape as an outer shape; and an outer peripheral surface of the rotating body comes in rolling contact with the outer peripheral surface of the case.

4. A damper of claim 3, wherein:

the shaft has a fragile portion that breaks when the force in the direction of rotating the case in the rotational direction about the axis received by the shaft is force of a predetermined magnitude or larger.

5. A damper of claim 4, wherein:

the case has an arm portion for holding the shaft; and the arm portion has a fragile portion that breaks when the force in the direction of rotating the case in the rotational direction about the axis received by the shaft is force of a predetermined magnitude or larger.

6. A damper of claim 5, wherein:

the second member is a stationary cam having a cam surface that rises and falls in a direction of the axis;

the first member is a slide cam having a cam surface that slides on the cam surface of the stationary cam when the slide cam rotates relative to the stationary cam in the rotational direction about the axis, with the sliding of the cam surface causing the slide cam to move in the direction of the axis; and the torque generation mechanism further comprises an elastic body that presses the cam surface of the slide cam against the cam surface of the stationary cam.

7. A damper of claim 4, wherein:

the second member is a stationary cam having a cam surface that rises and falls in a direction of the axis;

the first member is a slide cam having a cam surface that slides on the cam surface of the stationary cam when the slide cam rotates relative to the stationary cam in the rotational direction about the axis, with the sliding of the cam surface causing the slide cam to move in the direction of the axis; and the torque generation mechanism further comprises an elastic body that presses the cam surface of the slide cam against the cam surface of the stationary cam.

8. A damper of claim 3, wherein:

the case has an arm portion for holding the shaft; and the arm portion has a fragile portion that breaks when the force in the direction of rotating the case in the rotational direction about the axis received by the shaft is force of a predetermine magnitude or larger.

9. A damper of claim 8, wherein:

the second member is a stationary cam having a cam surface that rises and falls in a direction of the axis;

the first member is a slide cam having a cam surface that slides on the cam surface of the stationary cam when the slide cam rotates relative to the stationary cam in the rotational direction about the axis, with the sliding of the cam surface causing the slide cam to move in the direction of the axis; and the torque generation mechanism further comprises an elastic body that presses the cam surface of the slide cam against the cam surface of the stationary cam.

10. A damper of claim 3, wherein:

the second member is a stationary cam having a cam surface that rises and falls in a direction of the axis;

the first member is a slide cam having a cam surface that slides on the cam surface of the stationary cam when the slide cam rotates relative to the stationary cam in the rotational direction about the axis, with the sliding of the cam surface causing the slide cam to move in the direction of the axis; and the torque generation mechanism further comprises an elastic body that presses the cam surface of the slide cam against the cam surface of the stationary cam.

11. A damper of claim 2, wherein:

the shaft has a fragile portion that breaks when the force in the direction of rotating the case in the rotational direction about the axis received by the shaft is force of a predetermined magnitude or larger.

12. A damper of claim 11, wherein:

the case has an arm portion for holding the shaft; and the arm portion has a fragile portion that breaks when the force in the direction of rotating the case in the rotational direction about the axis received by the shaft is force of a predetermined magnitude or larger.

13. A damper of claim 12, wherein:

the second member is a stationary cam having a cam surface that rises and falls in a direction of the axis;

the first member is a slide cam having a cam surface that slides on the cam surface of the stationary cam when the slide cam rotates relative to the stationary cam in the rotational direction about the axis, with the sliding of the cam surface causing the slide cam to move in the direction of the axis; and the torque generation mechanism further comprises an elastic body that presses the cam surface of the slide cam against the cam surface of the stationary cam.

14. A damper of claim 11, wherein:

the second member is a stationary cam having a cam surface that rises and falls in a direction of the axis;

the first member is a slide cam having a cam surface that slides on the cam surface of the stationary cam when the slide cam rotates relative to the stationary cam in the rotational direction about the axis, with the sliding of the cam surface causing the slide cam to move in the direction of the axis; and the torque generation mechanism further comprises an elastic body that presses the cam surface of the slide cam against the cam surface of the stationary cam.

15. A damper of claim 2, wherein:

the case has an arm portion for holding the shaft; and the arm portion has a fragile portion that breaks when the force in the direction of rotating the case in the rotational direction about the axis received by the shaft is force of a predetermined magnitude or larger.

16. A damper of claim 15, wherein:

the second member is a stationary cam having a cam surface that rises and falls in a direction of the axis;

the first member is a slide cam having a cam surface that slides on the cam surface of the stationary cam when the slide cam rotates relative to the stationary cam in the rotational direction about the axis, with the sliding of the cam surface causing the slide cam to move in the direction of the axis; and the torque generation mechanism further comprises an elastic body that presses the cam surface of the slide cam against the cam surface of the stationary cam.

17. A damper of claim 2, wherein:

the second member is a stationary cam having a cam surface that rises and falls in a direction of the axis;

the first member is a slide cam having a cam surface that slides on the cam surface of the stationary cam when the slide cam rotates relative to the stationary cam in the rotational direction about the axis, with the sliding of the cam surface causing the slide cam to move in the direction of the axis; and the torque generation mechanism further comprises an elastic body that presses the cam surface of the slide cam against the cam surface of the stationary cam.

18. A damper according to claim 1, wherein:

the shaft has a fragile portion that breaks when the force in the direction of rotating the case in the rotational direction about the axis received by the shaft is force of a predetermined magnitude or larger.

19. A damper of claim 18, wherein:

the case has an arm portion for holding the shaft; and the arm portion has a fragile portion that breaks when the force in the direction of rotating the case in the rotational direction about the axis received by the shaft is force of a predetermined magnitude or larger.

20. A damper of claim 19, wherein:

the second member is a stationary cam having a cam surface that rises and falls in a direction of the axis;

the first member is a slide cam having a cam surface that slides on the cam surface of the stationary cam when the slide cam rotates relative to the stationary cam in the rotational direction about the axis, with the sliding of the cam surface causing the slide cam to move in the direction of the axis; and the torque generation mechanism further comprises an elastic body that presses the cam surface of the slide cam against the cam surface of the stationary cam.

21. A damper of claim 18, wherein:

the second member is a stationary cam having a cam surface that rises and falls in a direction of the axis;

the first member is a slide cam having a cam surface that slides on the cam surface of the stationary cam when the slide cam rotates relative to the stationary cam in the rotational direction about the axis, with the sliding of the cam surface causing the slide cam to move in the direction of the axis; and the torque generation mechanism further comprises an elastic body that presses the cam surface of the slide cam against the cam surface of the stationary cam.

22. A damper according to claim 1, wherein:

the case has an arm portion for holding the shaft; and the arm portion has a fragile portion that breaks when the force in the direction of rotating the case in the rotational direction about the axis received by the shaft is force of a predetermined magnitude or larger.

23. A damper of claim 22, wherein:

the second member is a stationary cam having a cam surface that rises and falls in a direction of the axis;

the first member is a slide cam having a cam surface that slides on the cam surface of the stationary cam when the slide cam rotates relative to the stationary cam in the rotational direction about the axis, with the sliding of the cam surface causing the slide cam to move in the direction of the axis; and the torque generation mechanism further comprises an elastic body that presses the cam surface of the slide cam against the cam surface of the stationary cam.

24. A damper of claim 1, wherein:

the second member is a stationary cam having a cam surface that rises and falls in a direction of the axis;

the first member is a slide cam having a cam surface that slides on the cam surface of the stationary cam when the slide cam rotates relative to the stationary cam in the rotational direction about the axis, with the sliding of the cam surface causing the slide cam to move in the direction of the axis; and the torque generation mechanism further comprises an elastic body that presses the cam surface of the slide cam against the cam surface of the stationary cam.

25. A damper for generating torque in a rotational direction about an axis, comprising:

a torque generation mechanism comprising a first member and a second member that rotate relative to each other in the rotational direction about the axis, to generate the torque about the axis;

a case housing the torque generation mechanism and having an outer peripheral surface of the case being provided with a projecting portion, the projecting portion projecting to a position away from the outer peripheral surface in an area including middle of both ends of the case, the projecting portion receiving an external force in a direction of rotating the case in about the axis in the area, the case being rotated about the axis due to the external force acting on the projecting portion; and the first member rotating relative to the second member about the axis, associated with rotation of the case about the axis.

26. A damper for generating torque in a rotational direction about an axis, comprising:

a torque generation mechanism comprising a first member and a second member that rotate relative to each other in the rotational direction about the axis, to generate torque in the rotational direction about the axis;

a case housing the torque generation mechanism; and an outer peripheral surface of the case being provided with a projecting portion for receiving force in a direction of rotating the case in the rotational direction about the axis;

the first member rotating relative to the second member in the rotational direction about the axis, associated with rotation of the case about the axis;

the second member being a stationary cam having a cam surface that rises and falls in a direction of the axis;

the first member being a slide cam having a cam surface that slides on the cam surface of the stationary cam when the slide cam rotates relative to the stationary cam in the rotational direction about the axis, with the sliding of the cam surface causing the slide cam to move in the direction of the axis; and the torque generation mechanism further comprises an elastic body that presses the cam surface of the slide cam against the cam surface of the stationary cam.

* * * * *